(No Model.) 3 Sheets—Sheet 1.
B. C. WHITE.
MACHINE FOR DRAWING RODS AND SHAFTING.
No. 323,762. Patented Aug. 4, 1885.
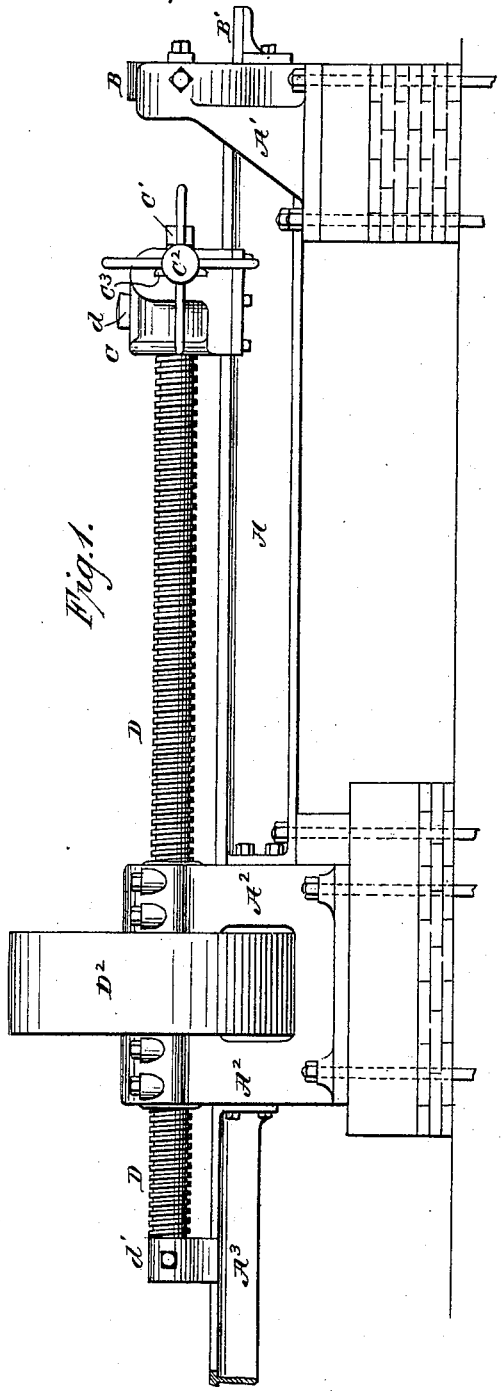
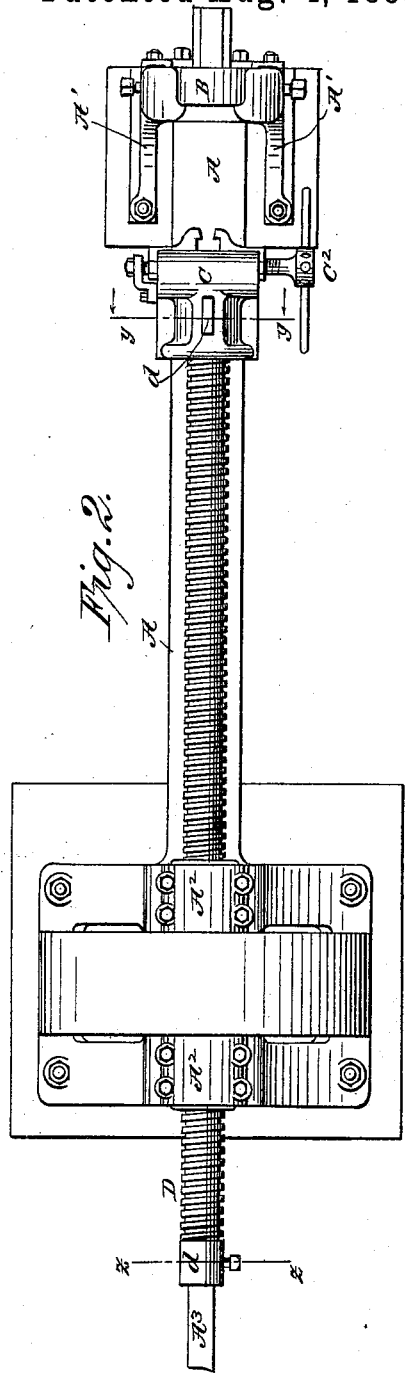

(No Model.) 3 Sheets—Sheet 2.
B. C. WHITE.
MACHINE FOR DRAWING RODS AND SHAFTING.
No. 323,762. Patented Aug. 4, 1885.
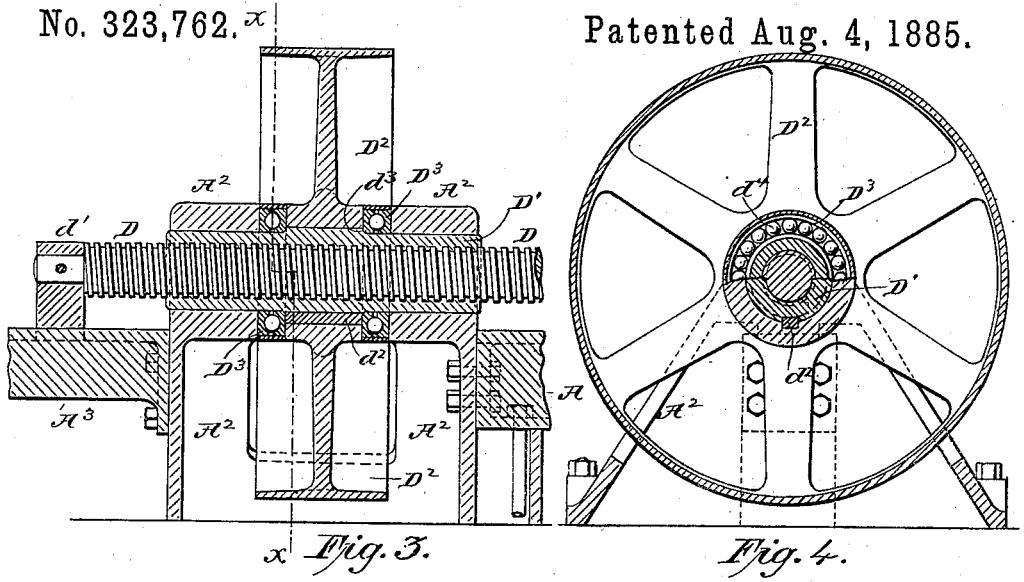
Fig. 3. Fig. 4.
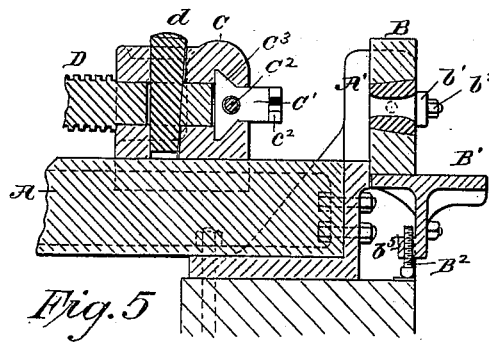 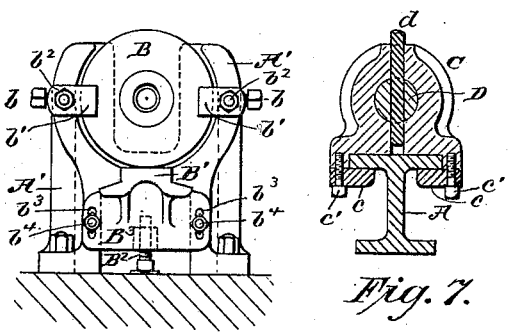
Fig. 5. Fig. 6. Fig. 7.
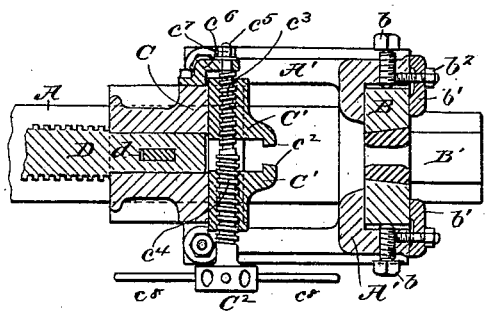 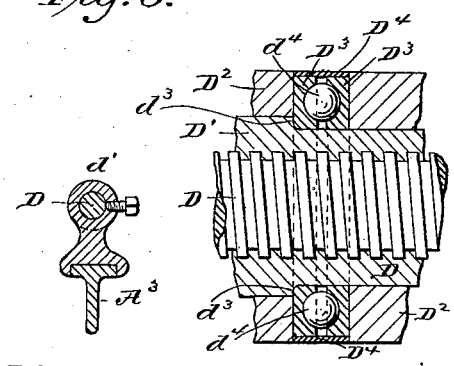
Fig. 8. Fig. 9. Fig. 10.
Witnesses:
G. Huzel.
Jno. H. Stockett.
Inventor,
B. Clark White
per M. E. Dayton
Attorney.

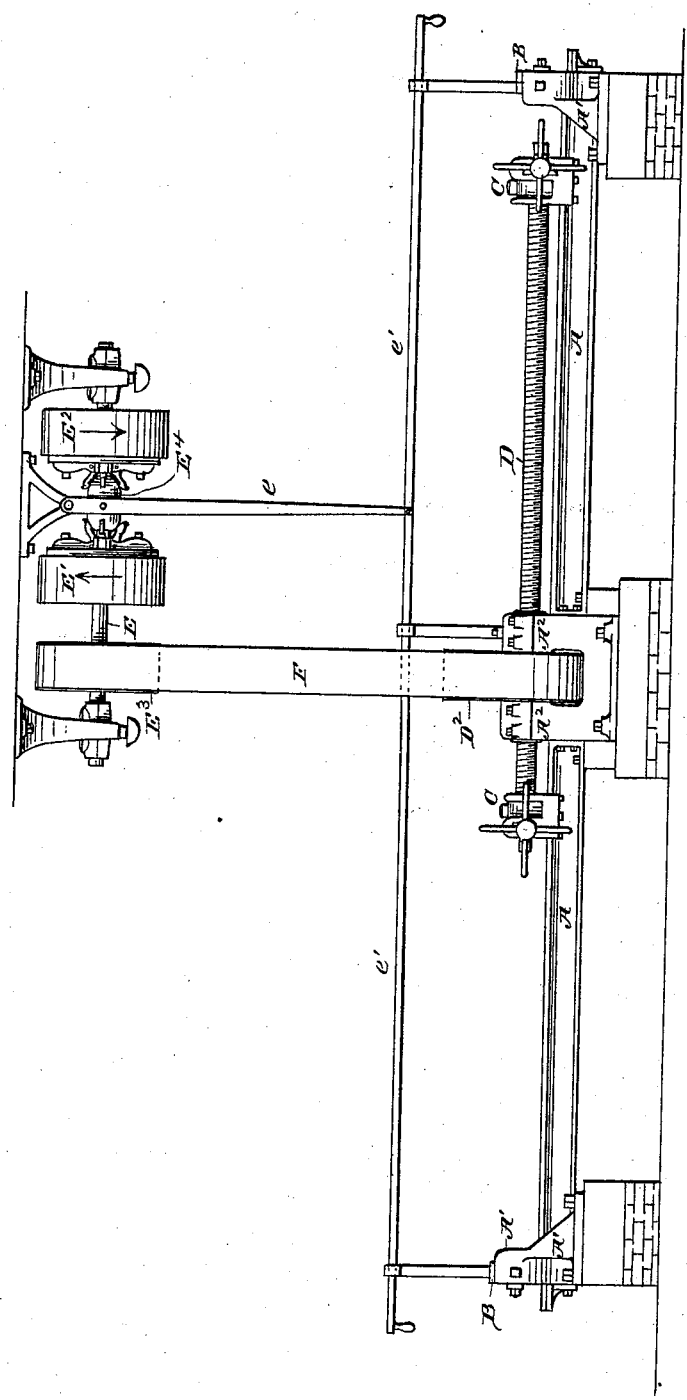

UNITED STATES PATENT OFFICE.

B. CLARK WHITE, OF CHICAGO, ILLINOIS, ASSIGNOR TO SAMUEL S. CHISHOLM, OF SAME PLACE.

MACHINE FOR DRAWING RODS AND SHAFTING.

SPECIFICATION forming part of Letters Patent No. 323,762, dated August 4, 1885.

Application filed September 22, 1884. (No model.)

*To all whom it may concern:*

Be it known that I, B. CLARK WHITE, of Chicago, in the county of Cook and State of Illinois, have invented certain new and useful Improvements in Machines for Drawing Metal Rods and Shafting; and I do hereby declare that the following is a full, clear, and exact description thereof, reference being had to the accompanying drawings, and to the letters of reference marked thereon, which form a part of this specification.

This invention relates to machines for drawing metal rods of either cylindrical or other sectional form, and has for its object to provide a strong and simple machine capable of doing the work in an accurate and expeditious manner.

In the machine for drawing rods and shafting invented by Winslow Allderdice, for which application for patent, Serial No. 126,367, was filed in the Patent Office of the United States April 2, 1884, two parallel and rotating screws are employed for operating the draw-head, said screws being stationary in the frame of the machine and working in interiorly-threaded nuts in the draw-head. In the present invention a traveling and non-rotating screw is employed working in a stationary and rotating nut. This forms the principal novel feature of the present invention; but other novel mechanisms of more or less importance are also herein shown, and pointed out in the appended claims.

No means are herein indicated for supporting the rod-blank in a horizontal position in the axis of the die as it enters the latter, as in the said Allderdice application; but such means, in the form of a simple table or of suitable rollers, may be employed, if desired. In the present machine, also, the drawn portion of the rod is not supported between the die-block and the drawing-head; it being found in practice not strictly necessary to interpose such support, because the drawing strain serves to keep the rod practically straight, and because, moreover, the principal object of accuracy in the operation of a drawing-machine is to avoid the production of short bends in a drawn rod, which are found difficult to straighten by rotative rod or shaft straightening machines. My invention is, however, capable of application in a machine constructed to support the drawn rod.

In the accompanying drawings, Figure 1 is a side elevation of a machine, illustrating the principal novel features of my present invention. Fig. 2 is a plan view of said machine. Fig. 3 is an axial vertical section of a part of the machine embracing the stationary nut through which the draft-screw runs. Fig. 4 is a vertical transverse section of the machine in the indirect line $x\ x$ of Fig. 3. Fig. 5 is a longitudinal central or axial section of the die-block, its supports, the draw-head, and a fragment of the draft-screw, together with adjacent parts of the bed or frame. Fig. 6 is a front elevation of the die-head, showing the die-block in place and the means of adjustably supporting said die-block. Fig. 7 is a transverse section of the draw-head and frame-girder through $y\ y$ of Fig. 2, looking in the direction of the arrow. Fig. 8 is a horizontal section through the parts shown in Fig. 5. Fig. 9 is a vertical transverse section through $z\ z$ of Fig. 2. Fig. 10 is an enlarged fragmentary section, showing more clearly the construction by which anti-friction roller-bearings are applied between the nut of the draft-screw and its supports. Fig. 11 is a side elevation of my improved machine constructed in duplex form, or with a die support and girder at each side of a central nut, and a draw-head applied to each end of the reciprocating screw, whereby the machine may be made to operate upon a rod in both movements of said screw, thereby increasing the capacity of the machine when the space or available room is sufficient for the purpose.

Referring to said drawings, A is a girder rigidly attached at one end to a die-support, A', and to supports $A^2\ A^2$ for the nut of the draft-screw at the other. C is the draw-head. D is the draft-screw connected with the draw-head. D' is a long interiorly-threaded nut fitted to the screw D and mounted in the supports $A^2$. $D^2$ is a pulley (or pinion, as the case may be) keyed to the nut D' between the opposite supports $A^2$, and therefore adapted to rotate the nut $D'$ and to reciprocate the screw D. In the single form of the machine a girder, $A^3$, suitably supported at its opposite ends, upholds the outer end of the screw D when the latter has a single draw-head; but in the duplex machine two girders A are located in line with each other on opposite sides of the nut-supports $A^2$, and are provided, as above stated, with die heads or supports $A'$ at their outer or extreme ends.

The die-block B is supported in the seat formed by the uprights of the die-head $A'$, with its axis in a horizontal position; and in order to bring the axis of said die accurately in line with the axis of the screw D or of the gripping-jaws of the draw-head, means are provided for adjusting said die-block to its place. Such means, as herein shown, consist, first, of a bed, $B'$, upon which the die-block B rests, and which is vertically movable by means of a screw, $B^2$, engaged with the bed $B'$ and the substructure, as indicated in Figs. 5 and 6. In this case the bed $B'$ is formed upon a vertical plate, $B^3$, slotted at $b^3$, and held adjustably in place against the front of the die-head $A'$ by means of nuts and bolts $b^4$. As shown in said Figs. 5 and 6, the shank of the screw $B^2$ works in an interiorly-threaded lug, $b^5$, on the rear face of the plate $B^3$, near its bottom, and the squared head of said nut $B^2$ rests upon the bottom plate of the die-head, if present, or on the substructure of the machine.

By means of the vertically-adjustable bed $B'$, constructed as described, or in any other suitable manner for the same purpose, the die-block B, whether square, as commonly made, or circular, as here shown, may be so lifted as to bring the axis or central line of the die proper accurately in line with the axis of the screw D, or of the grasping-jaws on the draw-head should the axes of the last-mentioned parts not coincide. A lateral adjustment of the die-block B may be effected by means of set-screws $b$, threaded through the lateral parts of the support $A'$, as plainly indicated in Figs. 6 and 8. The die being adjusted both laterally and vertically to proper alignment with the draw-head and draft-screw, it may be secured in its adjusted position by means of clamp-plates $b'$ and screws $b^2$, or by any other of many obvious means for the purpose. In the present case the die-block B is shown of circular form, and the lateral supports therefor belonging to the die-head $A'$ are correspondingly curved in form to approximate the die-block, though large enough to allow of necessary movement for the purposes of the adjustments above referred to. Further reference will be hereinafter made to the form of the die-block B.

The draw-head C is fitted to ride on the upper surface of the girder A, the latter being preferably single, centrally located, and in T form, as shown plainly in Fig. 7, and dressed smoothly and truly on its upper surface and on the lateral surfaces of its top flanges. When the girder is of this or equivalent sectional form, the draw-head C is provided with outer depending flanges, as shown in Fig. 7, and, as further shown in said figure, is detachably held in place upon the girder A by means of flanges $c$, removably secured to said depending flanges of the draw-head by screws $c'$.

The rod-grasping jaws of the draw-head are of peculiar construction. Heretofore such jaws have been pivoted to each other or to a draw-head at their rear ends, and have had a vibratory movement by which they grasp and release the headed end of the shaft operated upon. In the present instance the front face of the draw-head (that which is adjacent to the die-supporting head) is provided with a horizontal transverse T or V shaped groove, (indicated at $C^3$ in Fig. 5.) The jaws $C'$ are in the form of slides constructed to closely fit in this interiorly-enlarged groove $C^3$, as also indicated in said Fig. 5, and are caused to move toward and from each other by a right-and-left screw threaded through said jaws and held in a longitudinally stationary position by some suitable device for the purpose. In the present drawings said right-and-left-threaded screw $C^2$ has its two oppositely-threaded sections $c^3$ $c^4$ of unequal diameter, but provided with threads of the same pitch, and the said screw $C^2$ is longitudinally held by means of a bracket, $c^6$, and nut $c^7$, engaged with the smaller end $c^5$ of said screw, as shown in Fig. 8. Said end $c^5$ of the screw is reduced to afford a shoulder on the screw-shaft, which bears outwardly against the inner surface of the bracket $c^6$, so that by means of the said bracket and an outer nut, $c^7$, said screw is accurately held in its desired position. Any necessary adjustment of the screw and jaws may of course be made by the introduction of a washer or washers between the bracket $c^6$ and the shoulder of the screw which bears on said bracket; or shims may be placed between the bracket and frame. The hooks $c^2$ upon the jaws $C'$ are provided with opposite V-shaped notches, so that they accurately center the grasped end of the rod by its neck, while the head of the rod engages with the rear surfaces of the said hooks $c^2$ in a familiar manner to meet the draft in the operation of drawings.

The sections $a^3$ $a^4$ of the screw $C^2$ are of such relative diameters that the smaller may be directly pushed through the jaw having the threaded aperture for the larger. The object of this construction is to enable said screw to be forged with a heavy head or hub on the outer end of the section $c^4$, as shown, through which a bar may be passed or into which may be inserted the spokes $c^8$, by which said screw may be powerfully turned, so as to grasp the head with great firmness and security.

The draft-screw D is inserted in the draw-head C, as plainly shown in Figs. 5, 7, and 8, and is therein secured by means of a key, $d$, or any other suitable device for the purpose.

It will be observed that the gibs or flanges $c$ on the draw-head afford such a connection with the girder A as will hold said draw-head upright, while the connection of the screw D with the draw-head is such as prevents said screw from rotating. Other means may obviously be employed for the latter purpose, in which case the draw-head will be sufficiently held in place on the girder and guide A without the aid of the gibs $c$.

The longitudinally stationary and rotating nut D' is circular in transverse section and preferably generally cylindric in form, except that it has a central enlargement affording shoulders $d^3$, which mediately or immediately engage the stationary uprights $A^2$ of the frame and prevent longitudinal movement of said nut. Said central enlargement of the nut D' also affords keyway for the key $d^2$, by which the wheel, pulley, or pinion $D^2$ is secured to said nut, for the purpose of rotating it. In the present instance the shoulders $d^3$ of the nut do not bear directly against the uprights $A^2$; but there are interposed the two annular plates, $D^3$, which have their proximate faces correspondingly grooved to admit the anti-friction balls $D^4$, or which may be recessed in other form to admit conical rollers, if preferred, for the same purpose.

As will be plainly seen by reference to Fig. 10, the grooved rings $D^3$ do not touch each other, thus allowing room for wear of the anti-friction balls or of the surfaces of the grooves in which they run. The wear may be taken up, if desired, by the introduction of washers or shims behind the several grooved rings $D^3$. To cover the space otherwise left open between the adjacent rings $D^3$ and to retain oil or exclude dust and dirt, straps or bands $D^4$ are clasped about the rings $D^3$. The nut D is mounted in accurate alignment with the draw-head and die, or with its axis accurately parallel with the upper surface of the girder and draw-head A.

When the machine is of the duplex form shown in Fig. 11, the girders A are of equal dimensions and afford the proper support for both ends of the heavy screw D in all its positions through the media of the draw-heads C, affixed to the several ends of said screw and riding on the opposite girders A. When the machine is of the single form shown in Figs. 1 and 2, however, the girder or beam for upholding the tail of the screw D may be lighter, as indicated at $A^3$, having merely the office of supporting the said tail or rear end of the screw, in order that it may not bend by its weight as it is drawn backward in the operation of the machine. For the purpose of supporting the screw from the girder $A^3$ in this case, the small sliding block or head $d'$ shown in Figs. 1, 2, 3, and 9 may be employed, consisting merely of a short post fitted to ride freely on the upper surface of the girder $A^3$, and held upon the reduced end of the screw D by a set-screw or pin.

The operation of the machine described is entirely obvious. By the rotation of the nut D' by means of a belt-pulley, $D^2$, fixed thereon, as described, or by means of a pinion, (which would be the equivalent of said pulley,) the screw D being held from rotation, as set forth, will be drawn endwise in either direction, according to the direction of motion given to said pulley $D^2$. For the purposes of my invention any suitable and familiar means may be employed for giving the alternately-opposite movements of the pulley $D^2$ and the resulting reciprocation of the screw D. I have, however, in Fig. 11, shown a desirable construction for this purpose, consisting of a counter-shaft, E, provided with the oppositely-rotated clutch-pulleys E' and $E^2$ and a pulley, $E^3$, from which the belt is trained over the machine-pulley $D^2$. A splined clutch-slide, $E^4$, of any desirable construction suited to the form of clutch device upon the pulleys E' $E^2$, is mounted on the shaft E, and is shifted into engagement with either or neither one of the said pulleys E' $E^2$ by means of the shipping-lever $e$ or the horizontal longitudinally-movable shipping-rod $e'$, attached to the lower end of the lever $e$. The object of extending the shipping-rod $e'$ the length of the machine, as shown, is to afford the operator perfect control over the movements of the screw D from any point of the machine at which he may be standing.

In the single machine it is of course understood that but one die is employed, and that a shaft or rod is drawn through the die in only one movement of the screw D, the return movement being for the purpose of bringing the draw-head back into proper relation to the die-block preparatory to seizing and drawing another rod. In the duplex machine, shown in Fig. 11, on the contrary, a shaft may be drawn in each movement of the screw D, thereby avoiding loss of time in returning the said screw idly into position. Of course, for the purpose of a duplex machine, the screw D is made of such length as will be suitable for the longest shafts or rods to be drawn, in order that when one rod has been drawn through the die at one end of the machine the opposite draw-head will be in proximity with its adjacent die at the other end of the machine. Rods for shafting are generally of uniform or standard length, and ordinarily, therefore, little movement of the screw D will be required in either direction further than is necessary to finish the rod.

When the machine is of the single form, the screw may be given a more rapid return movement by unequal dimensions of the pulleys E' and $E^2$, or of the pulleys over which the belts to these are led.

In another application for patent filed of even date herewith by me I have shown a draw-head similarly constructed with reference to the transversely-sliding jaws to that here exhibited. In said other application, however, the longitudinally-fixed right-and-left screw is of uniform diameter, and the point of its engagement with a stationary part is at the middle of the screw. In said other and simultaneously filed application a similarly-operating adjustable die-bed is also shown, but in conjunction with parallel lateral supports for the die-block, said die-block being in that case rectangular in form instead of circular, as herein shown. It is plain that the circular die-block herein illustrated will be equally well supported between parallel lateral guides or supports as between curved or partly-circular supports, as herein described. The broader claims embraced in this case are to be understood as covering said other devices and their equivalents.

The circular form of the die-block B is regarded as an important improvement in shaft-drawing apparatus. Such blocks, as is well known, are of cast-iron and very heavy, in order to support the central die against the spreading strain brought upon it in drawing a shaft or rod. These blocks have heretofore been invariably made rectangular. In that form they are, of course, no stronger than in their shortest lines from center to margin, and the metal at the angles is not only practically useless, but objectionable, as adding greatly to the weight of the block. The rectangular form also necessitates the sliding or lifting of the die-block when the latter is moved to or from the machine, making the labor of the transportation (which is frequently required) very great. By constructing the block in circular form the surplus metal is dispensed with, or in the use of an equal weight of metal the block is made much stronger, and in any case of equal strength in all directions. At the same time the form of the block enables it to be rolled from place to place on the floor or into position in the machine, thereby greatly shortening the operation and lessening the labor of shifting dies in the current operation of the machine.

I claim as my invention—

1. The combination, in a rod-drawing machine, of a non-rotating draft-screw, a rotating nut on said screw, a support or supports for the nut, two ways extending beneath and parallel with the screw on opposite sides of the nut-support, a draw-head secured to each end of the screw and fitted to said ways, and a die-support at the outer end of each way, substantially as described.

2. The combination, with the non-rotating draft-screw and its rotating nut provided with a pulley, of a counter-shaft provided with oppositely-rotating loose clutch-pulleys, with a clutch-gland, and with a fixed pulley geared with the draft-screw, substantially as described.

3. The combination, with the way or ways and draw-head of a rod-drawing machine, of a die-block, a die-head, a support for the said die-block, constructed to move bodily in a vertical direction, means for moving said support and holding it in its changed position, and means for clamping and holding said die-block in position for operation, substantially as and for the purpose set forth.

4. The combination, in a die-head of a rod-drawing machine, of a die-block, lateral supports for the die-block, a support for the die-block, constructed to move bodily in a vertical direction, an adjusting-screw applied to raise and lower said support, and means for clamping and holding the die-block in operative position, substantially as and for the purpose set forth.

5. The combination, with a die-head of a rod-drawing machine, of a die-block, a support for the die-block, constructed to move bodily in a vertical direction, means for laterally adjusting the die-block, and means for clamping and holding said die-block in position for operation, substantially as and for the purpose set forth.

6. The combination, with the way or ways of a rod-drawing machine arranged parallel with the die-axis, of a draw-head fitted to said way or ways, transversely-sliding jaws on said draw-head, and suitable means for opening and closing said jaws, substantially as described.

7. The combination, with the fixed die-head and way or ways of a rod-drawing machine, of a draw-head provided with transversely-sliding jaws, and a right-and-left-threaded longitudinally-fixed screw engaged with the jaws and stationary parts of the draw-head, substantially as described.

8. The combination, with the draw-head and transversely-sliding jaws thereon, of a right-and-left-threaded screw engaged with the jaws, the oppositely-threaded parts of said screw being of unequal diameter, but having threads of equal pitch, as set forth, and said screw being provided with a solid head at the larger end, substantially as described.

In testimony that I claim the foregoing as my invention I affix my signature in presence of two witnesses.

B. CLARK WHITE.

Witnesses:
 M. E. DAYTON,
 OLIVER E. PAGIN.